United States Patent Office 3,684,439
Patented Aug. 15, 1972

3,684,439

HANDLING OF RAFFINATES FROM WET PHOSPHORIC ACID PURIFICATION

Roger A. Rose and Thomas U. Fox, St. Louis, Mo., assignors to Monsanto Company, St. Louis, Mo.

No Drawing. Filed Sept. 22, 1970, Ser. No. 74,490
Int. Cl. C01b 25/18, 25/22
U.S. Cl. 423—321 5 Claims

ABSTRACT OF THE DISCLOSURE

The handling of raffinates produced in a process for purification of wet process phosphoric acid by organic amine extraction is greatly enhanced by preventing solids from caking in the raffinate. This improvement is achieved by dilution the raffinate resulting from the contacting of wet phosphoric acid with an organic amine or organic amine and solvent extractant so as to transfer the phosphate values into the amine phase, diluting the raffinate with water or an acid having an acidity no greater than phosphoric acid, and thereafter additionally contacting said raffinate with additional amounts of amine extractant to further extract the phosphate values whereby the resulting raffnate from such additional contacting is stabilized against the formation of solids upon standing.

BACKGROUND OF THE INVENTION

This invention relates to a method for making raffinates resulting from a process for purification of wet process phosphoric acid by an organic amine or organic amine and solvent extraction more easily handled. More particularly, the invention relates to an improvement in the raffinate whereby the raffinate is stabilized against the formation of solids.

The term "wet process phosphoric acid" refers to phosphoric acid produced by well-known methods of acidulating phosphate rock with strong acids, for example, hydrochloric acid or sulfuric acid. Such wet acids contain various metallic and mineral impurities, which contaminate phosphates recovered from the acids so as to preclude their use of many applications without some degree of purification. For example, purification of phosphate values with respect to metallic impurities such as iron is generally required when the phosphate values and their derivatives are intended for use in detergent compositions.

It is well known that phosphate values can be extracted from wet process phosphoric acid by the use of water-insoluble organic amine extractants. Such an extraction process is described, for example, in U.S. Pat. 3,361,527. In such processes, phosphate values are preferentially extracted into the amine, resulting in significant purification with respect to metallic impurities. The resulting raffinates from such processes are then recycled to wet acid process or utilized through the manufacture of products such as fertilizers. However, the solids dissolved therein precipitate out during handling of the raffinate causing plugging of lines and pumps, caking on the bottom of the storage vessels and scaling on the sides of such vessels. Additionally, these caked precipitated solids are difficult to redisperse making the precipitated solids both obnoxious and a distinct economic disadvantage.

Broadly, it is an object of this invention to provide an improved process whereby the raffinate is stabilized against the formation of undesired solids. Other objects will be readily apparent from reading the following specification and examples.

SUMMARY OF THE INVENTION

In accordance with the foregoing objects, there is provided a process for modifying the character of raffinates from the process for purifying wet process phosphoric acid by organic amine extraction by diluting with a diluent selected from the group consisting of water and an acid with an acidity no stronger than phosphoric acid the aqueous raffinate resulting from the acid-amine contacting step and thereafter additionally contacting said raffinate with additional amount of amine extractant to further extract the phosphoric acid phosphate values whereby the resulting raffinate from such additional contacting is stabilized against the formation of solids upon standing.

DESCRIPTION OF THE PREFERRED EMBODIMENT

The solvent extraction is conducted by intimately contacting the wet process phosphoric acid with a water-insoluble organic amine extractant in either a batch or a continuous counter-current extraction process. The prosphoric acid is then stripped from the organic amine extractant with an aqueous stripping liquor. The aqueous solution left from contacting the wet process phosphoric acid with the amine extractant is referred to as the raffinate. Since such extraction processes have been described and are well understood by those skilled in the art, they will not be described in detail herein. Reference is made to U.S. Pat. 3,361,527 describing such a process and suitable amines and for the sake of brevity their description is incorporated herein by reference.

Preefrably, the process is carried out by series of contacts, in the first contact full strength wet process phosphoric acid with substantially "loaded" organic amine extractant, the second contacting is between the previously contacted wet process phosphoric acid and a fresh organic amine extractant, and so on until the final contacting step where the partially extracted wet phosphoric acid is contacted with fresh organic amine extractant which has not contacted the phosphoric aid. As previously indicated, the raffinate from any of these contacting steps or stages but prior to the final contacting step or stage when diluted with water or an acid which has an activity strength no greater than phosphoric acid and thereafter again contacted with the organic amine extractant results in a raffinate which is stabilized against the formation of solids which cake and are not redispersible. This is indeed a curious phenomena inasmuch as prior to its discovery it was known that solids once formed in a raffinate could not be redispersed by the addition of water.

Preferably the raffinate will be diluted in an amount as desired from about 5 to about 50% by volume. Furthermore, it has been found more preferable to dilute the raffinate from about 10 to about 30% volume so as to maximize the stabilization effect while at the same time minimizing the volume handling problem.

In addition to water there may be employed as diluents in this invention weak organic acids such as acetic, tartaric, citric and sulfamic. Another novel diluent useful in this invention is dilute solution of phosphoric acids such as those resulting from the use of water in re-extracting values from the organic amine extractant.

As taught in U.S. Pat. 3,361,527, the amine can be and generally is diluted with an organic solvent, the amounts and kinds of which are incorporated herein by reference.

The following example is included to illustrate the process of the present invention but is not to be considered limiting. Unless otherwise noted, all parts are by weight and all temperatures are in degrees centigrade.

To a multi-stage contactor wet process phosphoric acid, about 54% $P_2O_5$ value, was fed into the first stage at a rate of 440 cc./min. The organic amine extractant was about 50% by volume of tricaprylyl amine in a light aromatic petroleum fraction. To the last stage of the contactor unit was added about 90 cc./min. of water in addition to the acid raffinate from the previous stage for mixing and contacting with the organic amine/solvent extractant. After mixing, the mixture was allowed to continuously settle into two well defined portions of phosphoric acid and raffinate and each portion was continuously drawn off. Solids formation in the mixer settler were noticeably reduced and the raffinate clarity was improved to the point where it was substantially free of turbidity. The addition of water did not affect the overall amount of phosphate extracted into the organic amine solvent extractant as compared to when no water was added.

Similar results are obtained when the previously described weak phosphoric acid is used in place of water. Likewise, advantageous results are obtained by the use of organic acids such as acetic or citric.

Upon prolonged standing under storage conditions, the raffinate withdrawn from the final mixer settler unit remains free of objectionable caking solids, whereas under similar conditions without water, a heavy solid precipitate formed, which would not be redissolved by adding water even in excess of the amount added in the experiment described.

The foregoing example and method have been described in the specification for the purpose of illustration and not limitation. Many other modifications and ramifications will naturally suggest themselves to those skilled in the art based on this disclosure. These are intended to be comprehended as within the scope of this invention.

Having thus described the invention, what is desired to be claimed and secured by Letters Patent is:

1. In the process of purifying wet phosphoric acid by organic amine extraction and separation to yield a residual raffinate and purified wet process phosphoric acid the improvement which comprises diluting the aqueous raffinate with a diluent selected from the group consisting of water and dilute acids having an acidity strength not greater than phosphoric acid and thereafter additionally contacting said diluted raffinate with an additional amount of organic amine extractant to further extract the phosphoric acid whereby the resulting raffinate from such additional contacting is stabilized against the formation of solids upon standing.

2. The process of claim 1 wherein the raffinate is diluted from about 5 to about 50% by volume.

3. The process of claim 2 wherein the raffinate is diluted from about 10 to about 30% by volume.

4. The process according to claim 1 wherein the diluent is water.

5. The process according to claim 1 wherein the diluent is diluted phosphoric acid.

References Cited

UNITED STATES PATENTS

| | | | |
|---|---|---|---|
| 3,361,527 | 1/1968 | Hinkebein et al. | 23—165 |
| 3,573,005 | 3/1971 | Baniel et al. | 23—312 |

FOREIGN PATENTS

| | | | |
|---|---|---|---|
| 1,129,793 | 10/1968 | England | 23—165 |

EARL C. THOMAS, Primary Examiner

G. A. HELLER, Assistant Examiner

U.S. Cl. X.R.

23—312 P